(12) United States Patent
Shibata

(10) Patent No.: US 8,559,666 B2
(45) Date of Patent: Oct. 15, 2013

(54) SPEAKER DEVICE

(75) Inventor: Kiyosei Shibata, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 341 days.

(21) Appl. No.: 13/141,410

(22) PCT Filed: Sep. 25, 2009

(86) PCT No.: PCT/JP2009/066625
§ 371 (c)(1),
(2), (4) Date: Jun. 22, 2011

(87) PCT Pub. No.: WO2010/073787
PCT Pub. Date: Jul. 1, 2010

(65) Prior Publication Data
US 2011/0255730 A1    Oct. 20, 2011

(30) Foreign Application Priority Data
Dec. 25, 2008    (JP) ................. 2008-329571

(51) Int. Cl.
*H04R 1/02* (2006.01)
*F16M 11/04* (2006.01)
(52) U.S. Cl.
CPC .............. *H04R 1/026* (2013.01); *H04R 1/025* (2013.01); *F16M 11/04* (2013.01)
USPC ........ 381/395; 381/332; 381/334; 248/177.1; 248/187.1
(58) Field of Classification Search
USPC ........... 381/87, 150, 300, 332, 334, 336, 386, 381/395, 345; 181/198, 199; 248/127, 146, 248/176.1, 177.1, 187.1
See application file for complete search history.

(56) References Cited

U.S. PATENT DOCUMENTS

| | | | | |
|---|---|---|---|---|
| 5,031,865 A | * | 7/1991 | Blattner | 248/177.1 |
| 5,576,522 A | * | 11/1996 | Taso | 181/199 |
| 5,992,805 A | * | 11/1999 | Tanner | 248/161 |
| 2006/0153413 A1 | * | 7/2006 | Nakajima et al. | 381/345 |

FOREIGN PATENT DOCUMENTS

| | | |
|---|---|---|
| JP | U-5-6993 | 1/1993 |
| JP | A-11-289588 | 10/1999 |
| JP | U-3107462 | 12/2004 |

OTHER PUBLICATIONS

International Search Report issued in International Application No. PCT/JP2009/066625 on Oct. 27, 2009 (with translation).

* cited by examiner

*Primary Examiner* — Tuan D Nguyen
(74) *Attorney, Agent, or Firm* — Oliff & Berridge, PLC

(57) ABSTRACT

A speaker device having a speaker section firmly fixed to a stand section so the orientation of the speaker section relative to the stand section can be easily adjusted. The speaker device includes a speaker section, a stand section, and a fastening section for fastening the speaker section and the stand section to each other. The speaker section includes an engaging groove section, and a curved, contact receiving section which allows the angle of the speaker section relative to the stand section to be adjusted. The fastening section includes an engaging section engaging with the engaging groove section, and a screw thread section connected to the engaging section and engaging with a screw thread hole formed in the stand section. The fixation of the speaker section to the stand section can be adjusted by rotating the screw thread section to engage the screw thread section with the hole.

12 Claims, 4 Drawing Sheets

SPEAKER DEVICE

TECHNICAL FIELD

The present invention relates to a speaker device.

BACKGROUND ART

A speaker vibrates when outputting a sound. Therefore, in terms of improving a sound quality and suppressing the vibrations to peripheral portions thereto, a variety of measures are taken for preventing the vibrations from being transferred in a way that takes into consideration how the vibrations are transferred from the speaker to peripheral structures thereto. Further, it is desirable for a user to adjust a position and a direction of the speaker in an unrestricted manner in order to form a favorite acoustic space.

Under such circumstances, for example, as disclosed in Patent document 1, a technology is proposed, in which support pins each taking a cone shape are supported on footpads on a point-contact basis, and an anti-vibration sleeve is used for covering these pins; and as disclosed in Patent document 2, a technology is proposed, which prevents a decline of acoustic performance by supporting the speaker on one single support rod. A technology other than these technologies is proposed, which enables, as disclosed in, e.g., Patent document 3, a plurality of stacked speakers to be joined easily.

[Patent document 1] Japanese Registered Utility Model Application Publication No. 3107462
[Patent document 2] Japanese Patent Application Laid-Open Publication No. H11-289588
[Patent document 3] Japanese Unexamined Utility Model Application Publication No. H05-6993

DISCLOSURE OF THE INVENTION

Problems to be Solved by the Invention

The speaker needs firmly fixing to a stand for preventing an overturn and a fall-down and also preventing the decline of the sound quality that is due to a transfer of the vibrations between the speaker and the peripheral structures. While on the other hand, for enabling a user to form the acoustic space suited to a user's own favorite, it is required that the position and the direction of the speaker can be adjusted in desired states by the user. A configuration, which meets such a request, is that as in a speaker device 101 illustrated in FIG. 7, e.g., a support portion of a speaker 102 is constructed of two pieces of spikes 103, a length-adjustable angle adjusting screw 106 and three pieces of fixing bolts 105, in which the speaker 102 is fixed to the stand 104 with the bolts 105 at an arbitrarily determined angle by adjusting the length of the angle adjusting screw 106. In this speaker device 101, the speaker 102 is supported by minute contact faces of the spikes, the angle adjusting screw 106 and the bolts 105, whereby the transfer of the vibrations is reduced and the speaker 102 is firmly fixed to the stand 104 with the three bolts 105. When thus fixing the stand by use of the plurality of bolts etc in order to make adjustable the direction of the speaker while accomplishing compatibility between an improvement of the transfer characteristic of the vibrations and structural stability of the stand, however, the operation is time-consuming in the case of desiring to adjust the direction of the speaker.

It is an object of the present invention, which was devised in view of the problems described above, to provide a speaker device enabling a direction of a speaker unit with respect to a stand unit to be easily adjusted while firmly fixing the speaker unit to a stand unit.

Means for Solving the Problems

According to the present invention, a contrivance for solving the problems described above is that the speaker unit is supported by the stand unit via the contact portions and is fixed to the stand unit by screwing, into the screw hole of the stand unit, the screw joined to the engagement portion engaging with the engagement groove formed in the speaker unit. This contrivance can make adjustable a fixing state of the speaker unit to the stand unit simply by rotating the screw.

Specifically, the present invention is A speaker device comprising: a speaker unit to include a speaker body; a stand unit to include a contact portion coming into contact with said speaker unit and to support said speaker unit via said contact portion; and a fastening unit to fasten said speaker unit and said stand unit together so that said speaker unit is fixed to said stand unit in the state of being brought into contact with said contact portion, said speaker unit including: an engagement groove, to extend in back-and-forth directions of said speaker body, with which said fastening unit engages; and a contact target surface to abut on said contact portion and to be defined as a curved surface enabling an adjustment of an angle of said speaker unit with respect to said stand unit through a relative movement between said speaker unit and said stand unit along the back-and-forth directions of said speaker body, said fastening unit including: an engagement portion to engage with said engagement groove; and a screw portion to join with said engagement portion and to be screwed into a screw hole formed in said stand unit, wherein a state of fixing said speaker unit to said stand unit can be adjusted by rotating and thus screwing said screw portion into said screw hole.

In the speaker device, the speaker unit is supported by the stand unit via the contact portion provided on the stand unit. The contact target surface of the speaker unit, which comes into contact with the contact portion of the stand unit, is formed as the curved surface which enables an angle of the speaker unit to the stand unit to be adjusted. The contact target surface is formed as the curved surface, and hence the contact portion moves within the contact target surface while being brought into contact with the contact target surface, thereby changing a relative angle of the speaker unit with respect to the stand unit.

Herein, the speaker device includes the fastening unit which fixes the speaker unit to the stand unit and thus fastens these two units together by joining the speaker unit to the stand unit so as to be secured in the contact state with the contact portion of the stand unit. This fastening unit is configured such that the engagement portion engages with the engagement groove formed in the speaker unit. The engagement groove is formed in a way that extends along the back-and-forth directions of the speaker body, and therefore the fastening unit is movable relatively to the engagement groove along the back-and-forth directions of the speaker body. Further, the fastening unit includes the screw portion that is screwed into the screw hole formed in the stand unit. This screw portion is joined to the engagement portion, and hence, if in a state where the screw portion is screwed into the screw hole of the stand unit, the engagement portion engaging with the speaker unit is disabled from getting displaced with respect to the stand unit. The engagement portion, however, engages with the engagement groove capable of performing the relative movements along the back-and-forth directions of the speaker body as described above. Therefore, even when the engagement portion engages with the engagement groove and the screw portion is screwed into the screw hole of the stand unit, unless any fastening force is applied to the fastening unit, the speaker unit easily gets movable relatively to the stand unit.

By the way, since the contact target surface with which the contact portion comes into contact is formed as the curved surface as described above, when the speaker unit moves relatively to the stand unit along the back-and-forth directions of the speaker body in the state where the contact portion abuts on the contact target surface, an angle of the speaker unit to the stand unit changes, and it follows that the engage portion joined to the screw portion kept in the state of being screwed into the screw hole moves within the engagement groove along the back-and-forth directions of the speaker body. Accordingly, if the fastening force for fastening the speaker unit to the stand unit is not applied to the fastening unit, the angle of the speaker unit to the stand unit can be adjusted through the relative movement between the speaker unit and the stand unit, and, whereas if the fastening force is applied to the fastening unit, the speaker unit is fixed to the stand unit, with the result that the angle of the speaker unit to the stand unit is also fixed.

The fastening force of the fastening unit is generated by fastening the screw portion into the screw hole. Namely, in the state where the stand unit supports the speaker unit via the contact portion, as far as no relative movement is made between the stand unit and the speaker unit, the relative positional relation between the engagement groove of the speaker unit and the screw hole of the stand unit remains unchanged. Therefore, when the screw portion is rotated in the state where the screw portion of the fastening unit is screwed into the screw hole, the screw portion and the stand unit get relatively displaced, and hence the engagement portion joined to the screw portion also gets displaced. Accordingly, it is feasible to adjust the state of how the speaker unit is fixed to the stand unit by rotating the screw portion.

If the speaker device is configured as described above, the speaker unit is fixed to the stand unit by the fastening unit, and the direction of the speaker unit can be adjusted by rotating the screw portion, thereby enabling the direction of the speaker unit to the stand unit to be easily adjusted while firmly fixing the speaker unit to the stand unit.

Further, the contact portion may be brought into contact with said speaker unit at leastwise three protrusions, said speaker unit may further have guide channels, to extend along the back-and-forth directions of said speaker body, into which said protrusions of said contact portion are fitted, for guiding the relative movement of said stand unit with respect to said speaker unit, and the contact target surface may be formed on the bottom face of said guide channel.

If configured so that the three or more protrusions come into contact with the speaker unit, the speaker unit is supported at the three points while its attitude is stably kept, and the vibrations transferred to the stand unit from the speaker unit are suppressed because of a small contact area between the speaker unit and the stand unit. Moreover, the protrusion is fitted into the guide channel formed in the speaker unit in a manner that extends along the back-and-forth directions of the speaker body, and consequently the protrusion is guided along the longitudinal direction of the guide channel when moving the speaker unit relatively to the stand unit in the back-and-forth directions. Accordingly, this contrivance facilitates the operation in the back-and-forth directions to cause the relative displacement between the stand unit and the speaker unit and also facilitates the adjustment of the angle of the speaker unit with respect to the stand unit.

Further, the contact target surface may be the curved surface along a circular arc with a centroid of said speaker unit being centered. If the contact target surface is thus formed, even when changing the angle of the speaker unit with respect to the stand unit, it does not happen that the centroid of the speaker unit gets displaced relatively to the stand unit, thereby stabilizing the attitude of the speaker unit supported by the stand unit.

Further, the fastening unit may have a rod-shaped screw guide portion, provided at a tip of said screw portion, for guiding said screw portion into a screw hole of said stand unit when said screw portion is screwed into said screw hole of said stand unit. The thus-configured speaker device facilitates, because of the screw portion being guided through the screw hole when the screw portion is screwed into the screw hole in the state where the engagement portion engages with the engagement groove, the operation of fastening the speaker unit to the stand unit by use of the fastening unit.

Further, the stand unit further may include: an aperture, to be formed at one end of said engagement groove in a longitudinal direction, for enabling said engagement portion set in a non-engaged state with said engagement groove to engage with said engagement groove; and a resistance portion to be provided at said aperture and to restrain a motion of said engagement portion kept in the engaged state with said engagement groove and approximate to said aperture. If the speaker device is thus configured, in a state of canceling the fastening force of the fastening unit by turning the screw portion, when moving the speaker unit back and forth relatively to the stand unit, the engagement portion is prevented from easily coming off the engagement groove. Accordingly, such a possibility is eliminated that the speaker unit easily comes off the stand unit.

Effects of the Invention

It is feasible to provide the speaker device enabling the easy adjustment of the direction of the speaker unit with respect to the stand unit in a way that firmly fixes the speaker unit to the stand unit.

DESCRIPTION OF THE REFERENCE NUMERALS AND SYMBOLS

Figure 1:
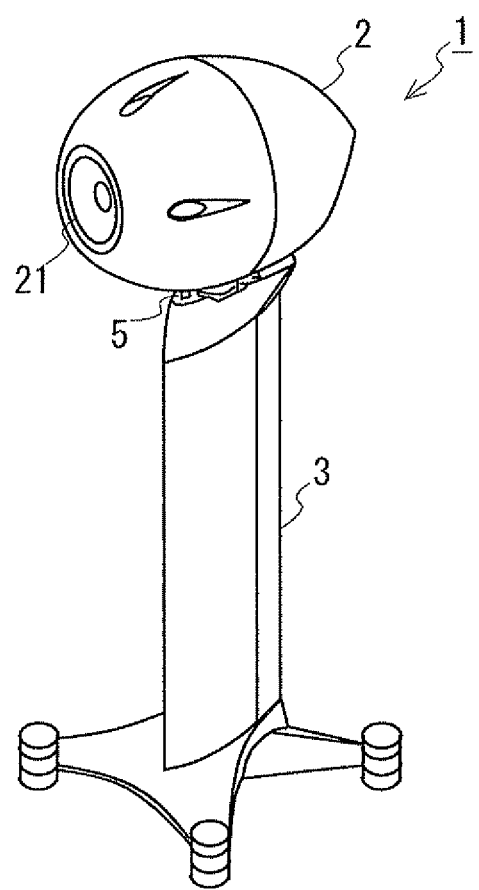
[FIG. 1] A view of an external appearance of a speaker device according to an embodiment.

1 . . . speak device
2 . . . speaker unit
21 . . . speaker
22 . . . engagement groove 25 . . . fall-down prevention rib
26 . . . guide channel
27 . . . curved surface
3 . . . stand
31 . . . protrusion
4 . . . guide screw
41 . . . engagement portion
43 . . . screw portion
44 . . . dial unit Embodiment for Carrying out the Invention An embodiment of the present invention will hereinafter be discussed. It should be noted that the following embodiment will be demonstrated on an exemplifying and not-limiting basis by way of a specific embodiment of the present invention but does not limit the scope of the right of the present invention.

FIG. 1 is a view of an external appearance of a speaker device 1 according to an embodiment. The speaker device 1 includes, as illustrated in FIG. 1, a speaker unit 2 (corresponding to a speaker unit according to the present invention) having a speaker 21 (corresponding to a speaker body according to the present invention), and a stand 3 (corresponding to a stand unit according to the present invention) which supports the speaker unit 2. The speaker unit 2 has the built-in speaker 21 which converts electric signals into sounds and is formed substantially in a spherical shape as its external appearance. The speaker unit 2 is fixed to the stand 3 by a fixing mechanism 5.

Figure 2:
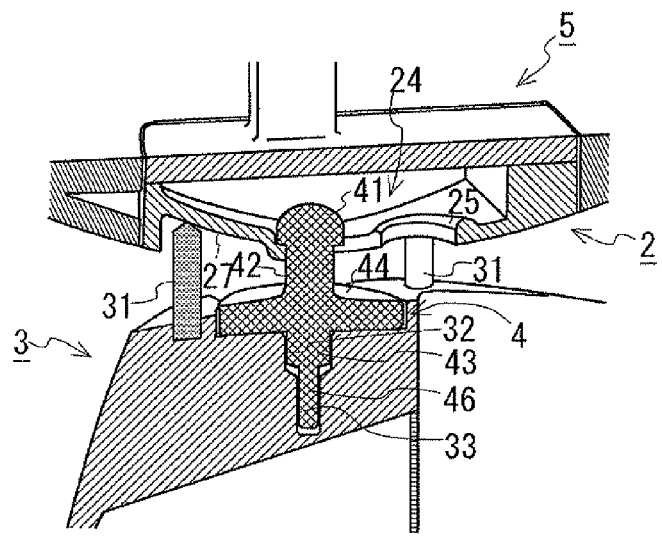
[FIG. 2] A view of a structure of a fixing mechanism of the speaker device and a peripheral structure thereto according to the embodiment

FIG. 2 is a view depicting the fixing mechanism 5 for fixing the speaker unit 2 to the stand 3 and a peripheral structure thereto. FIG. 2 illustrates a structure of the fixing mechanism 5 and a structure of the peripheral portion thereto as viewed from the left side of the speaker device 1 so that the left side corresponds to a front side of the speaker device 1, while the right side corresponds to the rear side of the speaker device 1. As depicted in FIG. 2, the fixing mechanism 5 is constructed of an engagement groove 22 formed in the speaker unit 2, a protrusion 31 protruding upward from the stand 3, a screw hole 32 formed in the stand 3, a guide screw 4 engaging with the engagement groove 22 and with the screw hole 32, and an aperture 23 enabling the guide screw 4 to be attached to and detached from the engagement groove 22. Further, FIG. 3 is a view illustrating in enlargement a state where especially the guide screw 4 engages with the engagement groove 22 in the fixing mechanism 5.

Figure 3:
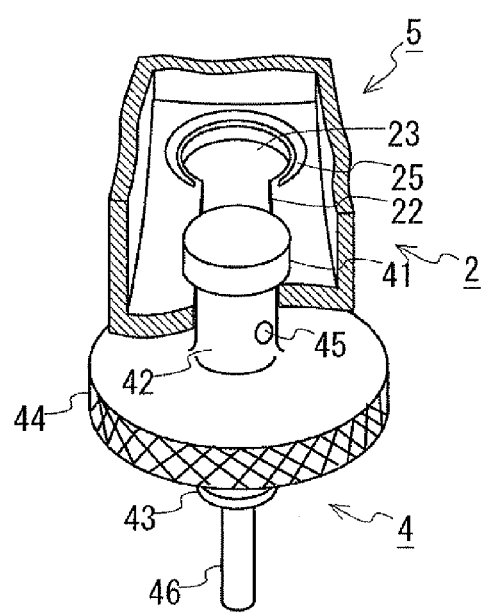
[FIG. 3] A view illustrating a state of how a guide screw engages with an engagement groove in the speaker device according to the embodiment.

As depicted in FIGS. 2 and 3, the engagement groove 22 is shaped as a thin elongate hole via which a hollowed portion 24 formed in a lower-sided portion of an interior of the speaker unit 2 communicates with the lower side of the speak. A contrivance is that this engagement groove 22 is shaped as the hole of which a width is smaller than a semispherical engagement portion 41 provided at the head of the guide screw 4, whereby the engagement portion 41 of the guide screw 4 does not come off but gets caught in the engagement groove 22. Note that the aperture 23 formed at one end of the engagement groove 22 in a longitudinal direction and enabling the guide screw 4 to be attached to and detached from the engagement groove 22, as illustrated in FIGS. 2 and 3, opens larger than the engagement portion 41 and thus allows the engagement portion 41 to be put in and taken out. The engagement groove 22 is shaped as the thin elongate hole extending from an edge of the hole shaping the aperture 23 toward the front of the speaker unit 2 and thereby enables a shaft 42 constituting the neck of the guide screw 4 to be received, thus getting the engagement portion 41 caught in the engagement groove 22 on the side of the hollowed portion 24. Note that the end of the aperture 23 on the side of the hollowed portion 24 is formed with a fall-down prevention rib that is ridged higher than the peripheral portion thereto. This fall-down prevention rib 25 regulates a motion of the engagement portion 41 so that the engagement portion 41 does not easily move to the aperture 23 from the engagement groove 22 by getting the engagement portion 41 of the guide screw 4 brought into contact with this ridged fall-down prevention rib 25 when the guide screw 4 moves within the engagement groove 22. It is to be noted that an expedient for regulating such a motion of the engagement portion 41 can involve applying, e.g., an elastically deformable member such as a sponge and a spring each functioning as an obstacle on such an occasion that the engagement portion 41 gets in and out of the engagement groove 22 via the aperture 23.

The screw hole 32 is a hole that opens upward from the upper edge of the stand 3 and is screwed with a screw portion 43 of the guide screw 4. The lower side of the screw hole 32 is formed with a guide hole 33 into which a guide 46 for guiding the screw hole 32 to the screw hole 32 is inserted. This guide hole 33 serves to make a relative alignment of the guide screw 4 with the stand 3 so that a central axis of the screw portion 43 becomes coincident with a central axis of the screw hole 32 when the screw portion 43 is screwed into the screw hole 32. Note that the guide screw 4 is provided with a disc-like dial unit 44 used for a user to perform a rotating operation of the screw portion 43. When screwing the screw portion 43 into the screw hole 32, the screw portion 43 is rotated through this dial unit 44. The engagement portion 41 gets displaced by rotating the screw portion 43 through the dial unit 44, thereby adjusting the fixing state of the speaker unit 2 to the stand 3. Namely, a condition of how the speaker unit 2 is fixed to the stand 3 is set in a firmly fixed state, a slightly slackened state or such a state that the speaker unit 2 gets separated from the stand 3 as the screw portion 43 is removed from the screw hole 32.

Figure 4:
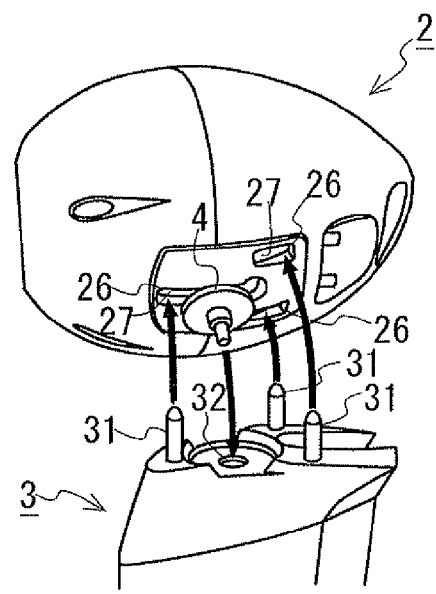
[FIG. 4] A view illustrating a fixing mechanism 5 of the speaker device according to the embodiment.

FIG. 4 is a view depicting the fixing mechanism 5 in the state where the speaker unit 2 is spaced away from the stand 3. As illustrated in FIG. 4, the upper edge of the stand 3 is provided with three pieces of protrusions 31 (corresponding to contact portions according to the present invention). The three protrusions 31 are fitted respectively into three guide channels 26 formed in the speaker unit 2, thus supporting the speaker unit 2 at three points. Further, each of tips of the protrusions 31 takes a spike-like shape, and consequently the protrusions 31 and the speaker unit 2 are brought into a point-contact state, thereby suppressing propagation of vibrations of the speaker 21 between the speaker unit 2 and the stand 3. Note that the screw hole 32 is located substantially in a central position of these three protrusions 31. Hence, in the state where the engagement portion 41 engages with the engagement groove 22, the screw portion 43 is screwed into the screw hole 32, and the speaker unit 2 is fastened to the stand 3 by the guide screw 4, at which time a load given from the speaker unit 2 is substantially equally applied to the respective protrusions 31. With this contrivance, the speaker unit 2 is fixed to the stand 3 in the state of being supported by the three protrusions 31. Further, the fixing mechanism 5 includes the three protrusions for stably supporting the speaker unit 2 and may also include four or more protrusions.

Figure 5:
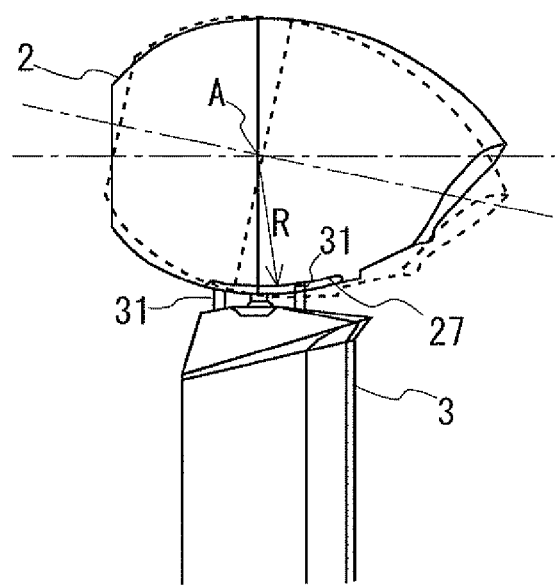
[FIG. 5] A view illustrating a movable range of a speaker body of the speaker device according to the embodiment.

FIG. 5 illustrates a range where the direction of the speaker unit 2 can the adjusted up and down. The guide channel 26 into which the protrusion 31 is fitted is a channel extending in back-and-forth directions of the speaker 21. Hence, the speaker unit 2 can be moved back and forth relatively to the stand 3 in the range where the protrusion 31 is movable along the guide channel 26. Therefore, the user is enabled to adjust the speaker unit 2 supported on the stand 3 at a desired angle.

Note that the movable range of the speaker unit is defined by angles of 0° through 12° to the horizon. A range of the adjustable angles is defined corresponding to a length of the engagement groove 22 in the longitudinal direction and a length of the guide channel 26 in the longitudinal direction, and, if these lengths are large, the movable range of the speaker unit 2 also expands. In the case of increasing the lengths of the engagement groove 22 and the guide channel 26, it is desired to properly adjust the layout thereof so as not to interfere with each other. Note that the back-and-forth directions of the speaker 21 represent a direction of the front face of the speaker 21, i.e., the direction in which the sound of the speaker 21 travels is the forward direction, while the reverse direction is the backward direction. Herein, if a plurality of speakers is fitted to the speaker unit 2 in directions different from each other, the direction of any arbitrarily-selected speaker is set as a benchmark.

Herein, the bottom face of the guide channel 26 forms a curved surface 27 (corresponding to a noncontact surface according to the present invention) along a circular arc having a radius indicated by a symbol "R" with a symbol "A" being centered in FIG. 5, and the protrusions 31 abut on this surface, thereby supporting the speaker unit 2. The symbol "A" in FIG. indicates a position of a centroid of the speaker unit 2. The curved surface 27 is formed along the circular arc in such a way that the centroid of the speaker unit 2 is centered, and hence, as far as the protrusions 31 support the speaker unit 2 in the state of abutting on the curved surface 27 no matter how the speaker unit 2 changes its attitude, the centroid of the speaker unit 2 remains substantially in the same position. Further, heights of the three protrusions 31 are each adjusted so that the centroid of the speaker unit 2 is positioned on the central axis of the guide screw 4 in the state where the screw portion 43 is screwed in the screw hole 32. Accordingly, on condition that the stand 3 stands erect, even in the slackened state of the guide screw 4, the speaker unit is supported by the three protrusions 31 so as not to fall down from the stand 3.

Figure 6:
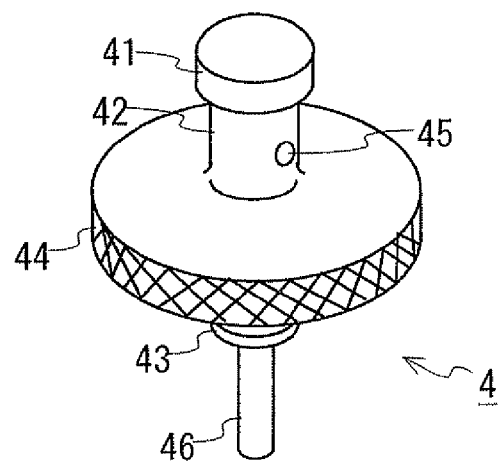
[FIG. 6] A view of an external appearance of the guide screw of the speaker device according to the embodiment.
Figure 7:
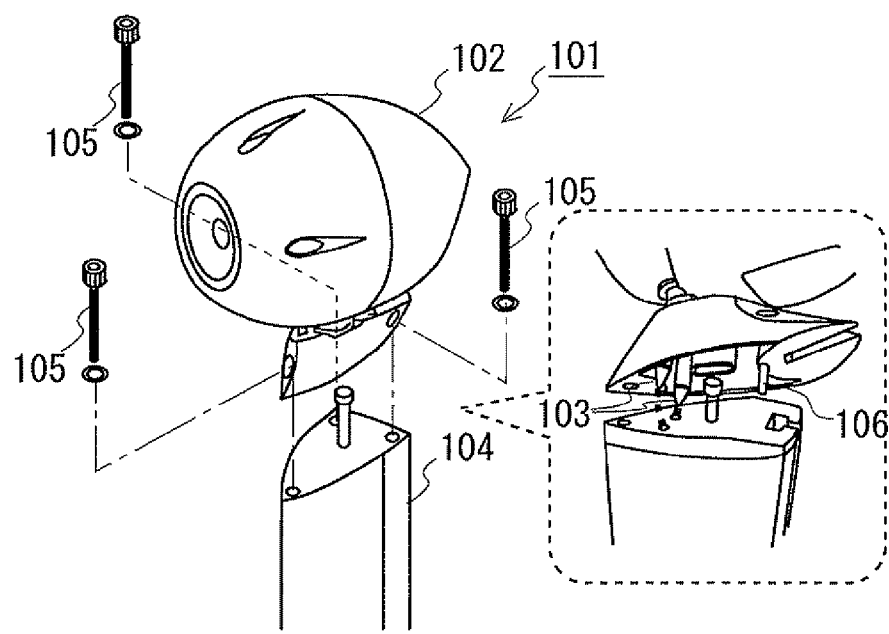
[FIG. 7] A view of an external appearance of a speaker device according to the prior art.

FIG. 6 is a view of an external appearance of the guide screw 4. As depicted in FIG. 6, the shaft 42 of the guide screw 4 is formed with a through-hole 45 which penetrates the shaft 42. This arrangement intends to enable, if the guide screw 4 is fastened as firmly as disabling the user from performing the rotating operation by use of the dial unit 44, the guide screw 4 to be rotationally driven by a metallic rod etc being inserted into this through-hole 45. The dial unit 44 is thereby enabled to rotate the guide screw 4 even if disabled from rotationally driving the guide screw 4.

If the speaker device 1 is configured as described above, it is feasible to conduct the operations ranging from assembling the speaker unit 2 to the stand 3 down to adjusting the angle of the speaker unit 2 simply by rotationally driving the guide screw 4, so that the assembly can be attained extremely easily as compared with the case of supporting the speaker device 1 at the three points with bolts etc.

It should be noted that the speaker unit 2 taking substantially the spherical shape in external appearance is fixed by the stand 3 in the embodiment discussed above, however, the application target of the present invention is not limited to the embodiment such as this. The present invention can be also applied to, e.g., a speaker body taking a rectangular shape in external appearance and a stand having almost no height in the vertical direction. If applied to the speaker body taking the rectangular shape in external appearance, however, at least the bottom faces of the guide channel and the engagement groove need forming as curved surfaces.

The invention claimed is:

1. A speaker device comprising:
    a speaker unit to include a speaker body;
    a stand unit to include a contact portion coming into contact with said speaker unit and to support said speaker unit via said contact portion; and
    a fastening unit to fasten said speaker unit and said stand unit together so that said speaker unit is fixed to said stand unit in the state of being brought into contact with said contact portion,
    said speaker unit including:
    an engagement groove, to extend in back-and-forth directions of said speaker body, with which said fastening unit engages; and
    a contact target surface to abut on said contact portion and to be defined as a curved surface enabling an adjustment of an angle of said speaker unit with respect to said stand unit through a relative movement between said speaker unit and said stand unit along the back-and-forth directions of said speaker body,
    said fastening unit including:
    an engagement portion to engage with said engagement groove; and
    a screw portion to join with said engagement portion and to be screwed into a screw hole formed in said stand unit,
    wherein a state of fixing said speaker unit to said stand unit can be adjusted by rotating and thus screwing said screw portion into said screw hole.

2. The speaker device according to claim 1, wherein said contact portion is brought into contact with said speaker unit at leastwise three protrusions,
    said speaker unit has guide channels, to extend along the back-and-forth directions of said speaker body, into which said protrusions of said contact portion are fitted, for guiding the relative movement of said stand unit with respect to said speaker unit, and
    the contact target surface is formed on the bottom face of said guide channel.

3. The speaker device according to claim 1, wherein the contact target surface is the curved surface along a circular arc with a centroid of said speaker unit being centered.

4. The speaker device according to claim 1, wherein said fastening unit has a rod-shaped screw guide portion, provided at a tip of said screw portion, for guiding said screw portion into a screw hole of said stand unit when said screw portion is screwed into said screw hole of said stand unit.

5. The speaker device according to claim 1, wherein said stand unit includes:
    an aperture, to be formed at one end of said engagement groove in a longitudinal direction, for enabling said engagement portion set in a non-engaged state with said engagement groove to engage with said engagement groove; and
    a resistance portion to be provided at said aperture and to restrain a motion of said engagement portion kept in the engaged state with said engagement groove and approximate to said aperture.

6. The speaker device according to claim 2, wherein said fastening unit has a rod-shaped screw guide portion, provided at a tip of said screw portion, for guiding said screw portion into a screw hole of said stand unit when said screw portion is screwed into said screw hole of said stand unit.

7. The speaker device according to claim 3, wherein said fastening unit has a rod-shaped screw guide portion, provided at a tip of said screw portion, for guiding said screw portion into a screw hole of said stand unit when said screw portion is screwed into said screw hole of said stand unit.

8. The speaker device according to claim 2, wherein said stand unit includes:
- an aperture, to be formed at one end of said engagement groove in a longitudinal direction, for enabling said engagement portion set in a non-engaged state with said engagement groove to engage with said engagement groove; and
- a resistance portion to be provided at said aperture and to restrain a motion of said engagement portion kept in the engaged state with said engagement groove and approximate to said aperture.

9. The speaker device according to claim 3, wherein said stand unit includes:
- an aperture, to be formed at one end of said engagement groove in a longitudinal direction, for enabling said engagement portion set in a non-engaged state with said engagement groove to engage with said engagement groove; and
- a resistance portion to be provided at said aperture and to restrain a motion of said engagement portion kept in the engaged state with said engagement groove and approximate to said aperture.

10. The speaker device according to claim 4, wherein said stand unit includes:
- an aperture, to be formed at one end of said engagement groove in a longitudinal direction, for enabling said engagement portion set in a non-engaged state with said engagement groove to engage with said engagement groove; and
- a resistance portion to be provided at said aperture and to restrain a motion of said engagement portion kept in the engaged state with said engagement groove and approximate to said aperture.

11. The speaker device according to claim 6, wherein said stand unit includes:
- an aperture, to be formed at one end of said engagement groove in a longitudinal direction, for enabling said engagement portion set in a non-engaged state with said engagement groove to engage with said engagement groove; and
- a resistance portion to be provided at said aperture and to restrain a motion of said engagement portion kept in the engaged state with said engagement groove and approximate to said aperture.

12. The speaker device according to claim 7, wherein said stand unit includes:
- an aperture, to be formed at one end of said engagement groove in a longitudinal direction, for enabling said engagement portion set in a non-engaged state with said engagement groove to engage with said engagement groove; and
- a resistance portion to be provided at said aperture and to restrain a motion of said engagement portion kept in the engaged state with said engagement groove and approximate to said aperture.

\* \* \* \* \*